(12) United States Patent  (10) Patent No.: US 11,592,315 B1
Wilson  (45) Date of Patent: Feb. 28, 2023

(54) AIRCRAFT FLARE-ASSIST LANDING SYSTEM

(71) Applicant: John M. Wilson, Hanover, NH (US)

(72) Inventor: John M. Wilson, Hanover, NH (US)

( * ) Notice: Subject to any disclaimer, the term of this patent is extended or adjusted under 35 U.S.C. 154(b) by 293 days.

(21) Appl. No.: 16/811,912

(22) Filed: Mar. 6, 2020

Related U.S. Application Data

(60) Provisional application No. 62/815,544, filed on Mar. 8, 2019.

(51) Int. Cl.
| | |
|---|---|
| *G09G 5/00* | (2006.01) |
| *G01C 23/00* | (2006.01) |
| *G09G 5/02* | (2006.01) |
| *G09G 5/10* | (2006.01) |
| *B64D 43/00* | (2006.01) |
| *G06F 8/61* | (2018.01) |
| *H04L 67/00* | (2022.01) |

(52) U.S. Cl.
CPC .......... *G01C 23/005* (2013.01); *B64D 43/00* (2013.01); *G06F 8/61* (2013.01); *G09G 5/02* (2013.01); *G09G 5/10* (2013.01); *G09G 2320/0626* (2013.01); *G09G 2320/0666* (2013.01); *G09G 2380/12* (2013.01); *H04L 67/34* (2013.01)

(58) Field of Classification Search
CPC ..... G01C 23/005; G01S 13/95; G01S 13/953; G01S 13/913; G01S 13/86; B64D 43/00; B64D 45/08; G08G 5/0091; G08G 5/2021; G06F 8/61; G09G 5/02; G09G 5/10; G09G 2320/0626; G09G 2320/0666; G09G 2380/12; H04L 67/34; G02B 27/0101; G02B 27/014

USPC .............................................................. 345/8

See application file for complete search history.

(56) References Cited

U.S. PATENT DOCUMENTS

| | | | | |
|---|---|---|---|---|
| 4,057,782 | A * | 11/1977 | Muller ................. | G01C 23/005 |
| | | | | 340/972 |
| 2016/0379502 | A1* | 12/2016 | Lepage .................. | B64D 43/00 |
| | | | | 701/16 |
| 2017/0214904 | A1* | 7/2017 | Wyatt ................... | G01C 23/005 |
| 2017/0364092 | A1* | 12/2017 | Bazile .................. | G05D 1/0825 |
| 2020/0184725 | A1* | 6/2020 | Venugopalan ........ | G06T 19/006 |

\* cited by examiner

*Primary Examiner* — Jennifer T Nguyen

(74) *Attorney, Agent, or Firm* — Downs Rachlin Martin PLLC

(57) ABSTRACT

A system and method for sensing height above landing surface for an aircraft, processing that sensed height information to provide information useful to the aircraft pilot for assisting with the landing and flare-to-land maneuver, and providing the processed information in a peripheral vision display indicating landing conditions sequentially without interfering with pilot vision and focus on the landing area.

23 Claims, 6 Drawing Sheets

AIRCRAFT FLARE-ASSIST LANDING SYSTEM

RELATED APPLICATION DATA

This application claims the benefit of priority of U.S. Provisional Patent Application Ser. No. 62/815,544, filed Mar. 8, 2019, and titled "Height Measurement And Display for Aircraft Landing", which is incorporated by reference herein in its entirety.

FIELD OF THE INVENTION

The present invention generally relates to the field of aircraft instrumentation. In particular, the present invention is directed to an aircraft flare-assist landing system.

BACKGROUND

One of the most important skills to be learned by a pilot is the flare-to-land maneuver. In a manually-controlled flare-to-land maneuver, the aircraft must be brought to a state immediately above the runway at a minimum airspeed, and kept there while any residual extra airspeed bleeds off. The pitch attitude of the aircraft is gradually increased during this period, until the aircraft descends slowly and the wheels, skis or skids on the bottom of the aircraft to make gentle contact with the runway. If the flare maneuver is carried out too quickly, the aircraft will "balloon" and then drop hard when the airspeed decays and lift is lost. If the flare maneuver is not carried out rapidly enough, then the aircraft will strike the runway while still at flying speed and too low a pitch attitude. In this case it may bounce and yield the need to abort the landing, or attempt to rescue the landing with another flare attempt. Thus, timing of the flare maneuver with respect to the distance remaining before touchdown is of paramount importance.

There are many ways in which the pilot can be misled regarding height remaining before touchdown. In order to judge distance remaining, the pilot looks straight down the runway and observes the perspective view of the runway edges. As the aircraft descends closer, this provides the most sensitive information for height estimation. Unfortunately, numerous challenges result from runways that are much wider or much narrower than the runway the pilot may have most recently landed on, or that the pilot is most accustomed to landing on. In addition, the lighting intensity changes the perception of height above the runway, with the night environment and low-visibility environments in general yielding a sensation of greater-than-actual height.

Various assist devices have been proposed to assist pilots with landing maneuvers, some devices even entirely automating the landing process. However, solutions proposed to date still have many disadvantages or are simply unworkable for many types of aircraft, for example small or light aircraft. On some larger aircraft, such as airliners, radar altimeters are used with an auto-land system that completely automates the landing procedure, effectively taking the "stick" out of the pilot's hands. However, radar altimeters are bulky, heavy, require substantial power, and can result in electromagnetic interference with other aircraft equipment making them generally unsuitable for use in small, light aircraft. Thus, while radar altimeters have been successfully employed in transport-category aircraft for auto-land systems and for terrain warning systems, their use in smaller less-expensive aircraft has not followed for the above reasons. In addition to the above disadvantages, multi-path errors at short ranges can result in radar altimetry signals being unusable for the precise and accurate measurements of very short distances needed for a practical flare-assistance device.

Landing assist devices based on ultrasonic sensors have also been proposed. Ultrasonic sensors are small, lightweight and low-power, but they require open contact with air to work, and are easily spoofed by noise due to aerodynamic turbulence. The ultrasonic signal also can be saturated by other noise sources such as engine noise under certain flight conditions. In addition, their range is extremely limited and may not be sufficient for a flare-assistance system.

A further disadvantage of prior systems is the lack of a user interface well-suited to providing appropriate and reliable indications to the pilot, while allowing the pilot to maintain manual control of the aircraft with visual focus and concentration on the landing area. As mentioned above, auto-land systems are complex instruments that fully control the landing procedure and therefore do not provide such an interface. An audio interface, e.g. height above ground call-outs, is disadvantageous for a number of reasons. Given the inherent discontinuous character of discrete call-outs, trend information is difficult to convey to the pilot. Also, information provided into the pilot's audio feed can interfere with flight controller communication or may be blocked by other audio alerts or sounds in the cockpit of an aircraft.

SUMMARY OF THE DISCLOSURE

In one implementation, the present disclosure is directed to an aircraft landing flare assist system, which includes a distance sensor configured to be mounted in an aircraft to measure a distance above a landing surface and generate a measurement signal indicative of the measured distance; a processor system configured to receive the measurement signal from the distance sensor, and further configured to (i) compare the measured distance to a series of threshold values, each threshold value corresponding to a different flare condition, and (ii) generate a current flare condition signal corresponding to a threshold value matched to the measured distance in the compare; and a visual display configured to receive the current flare condition signal and present a visual display representing the current flare condition.

In another implementation, the present disclosure is directed to an aircraft landing flare assist system, which includes a distance sensor configured to be mounted in an aircraft to measure a distance above a landing surface and generate a measurement signal indicative of the measured distance; a processor system configured to receive the measurement signal from the distance sensor, and further configured to (i) compare the measured distance to a series of threshold values, each threshold value corresponding to a different flare condition, and (ii) generate a current flare condition signal corresponding to a threshold value matched to the measured distance in the compare; and a visual display configured and dimensioned to be mounted on an aircraft glare shield without obstructing the pilot's central vision of the landing surface during landing and further configured to receive the current flare condition signal and present a visual display representing the current flare condition.

In yet another implementation, the present disclosure is directed to a method for assisting an aircraft pilot during a flare-to-land maneuver as the aircraft approaches a landing surface. The method includes repeatedly detecting the height of the aircraft above the landing surface during the approach; comparing the detected heights to a series of decreasing threshold values, each the threshold value corresponding to a different flare condition; and displaying the changing flare conditions to the pilot within the pilot's peripheral vision and outside of the pilot's central vision in a series of displays of changing colors and increasing brightness as the aircraft approaches the landing surface.

In a further implementation, the present disclosure is directed to a kit for installing an aircraft landing flare assist system in an aircraft. The kit includes a wireless distance sensor configured to be mounted to an external lighting mount on the aircraft and measure a distance above a landing surface with a light also installed in the same location, the wireless distance sensor further configured to generate a wireless measurement signal indicative of the measured distance; and a software application downloadable to the mobile device to configure the mobile device to receive the wireless measurement signal from the wireless distance sensor, and to (i) compare the measured distance to a series of threshold values, each threshold value corresponding to a different flare condition, to determine a current flare condition and (ii) generate a visual representation of the current flare condition on the mobile device display.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

DETAILED DESCRIPTION

Figure 1:
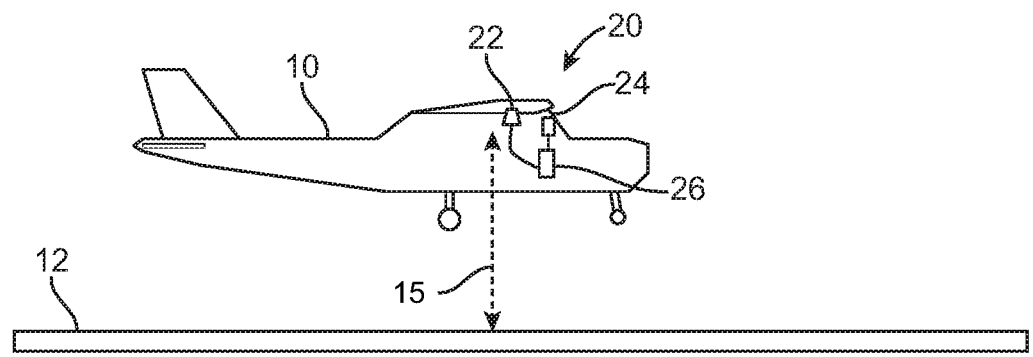
FIG. 1 is a schematic depiction of a system according to the present disclosure.
Figure 2:
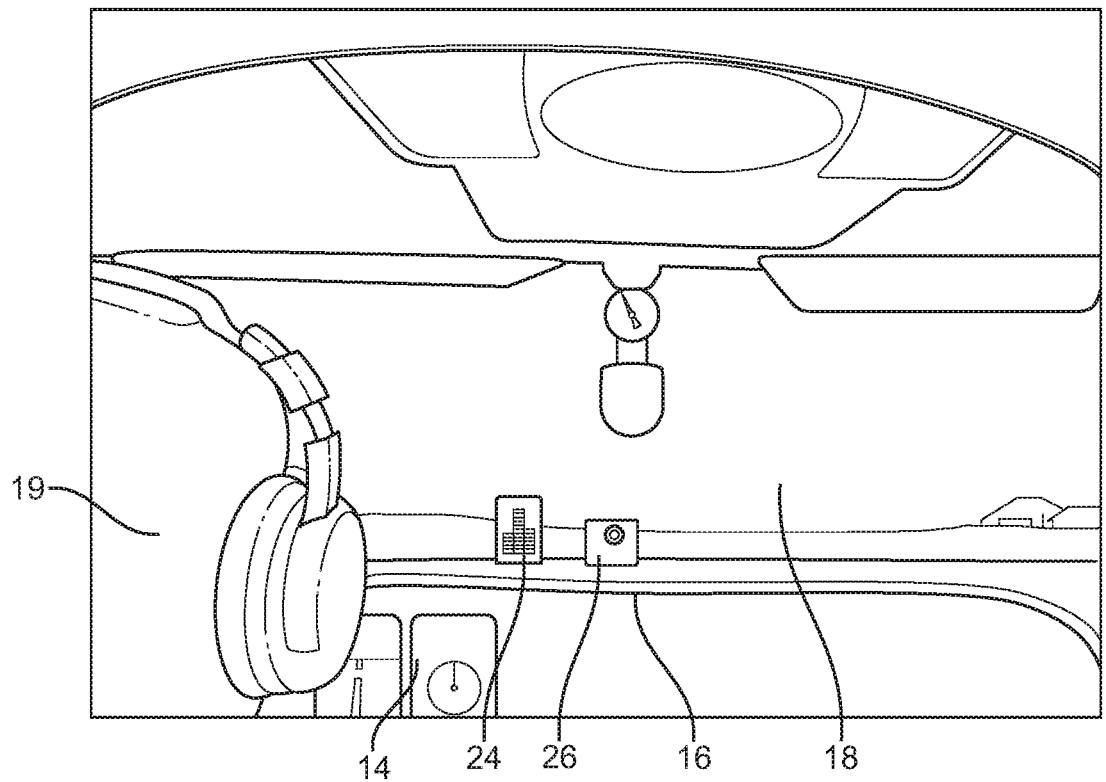
FIG. 2 illustrates positioning of a display from the perspective of looking forward in the plane's cockpit according to an embodiment of the present disclosure.

FIG. 1 illustrates aircraft 10 approaching landing surface 12, and embodiment of a flare assist system 20 according to the present disclosure. In this embodiment, system 20 includes distance sensor 22 communicating with display 24 through processor system 26. Distance sensor 22 may comprise a downward-looking distance measuring sensor, such as a LIDAR sensor, that determines the height 15 of the sensor above ground level. Display 24 provides a height-above-ground visual display, which may be located above the glare shield and in such a position that it is perceivable in the pilot's peripheral vision as shown, for example, in FIG. 2. In this position, display 24 does not interfere with a direct forward view of the runway environment during landing. Also depicted in FIG. 2 are the aircraft instrument panel 14, glare shield 16 on which display 24 is mounted, windscreen 18 and pilot 19. In the example shown in FIG. 2, processor system 26 is also mounted on glare shield 16. Mounting of processor system 26, or GUI elements thereof, on glare shield 16 or on instrument panel 14 may facilitate adjustments to system 20 such as brightness control and/or powering the system on and off. Processor system 26 also may be positioned at other convenient locations in the aircraft. In a further alternative embodiment, display 24 and processor system 26 may be incorporated into a single, compact housing mountable above the glare shield in the pilot's peripheral vision as shown in FIG. 2 for display 24.

In one exemplary embodiment, distance sensor 22 comprises a LIDAR-based distance detector using a laser as the sensing means. Laser-based sensing for distance measurement in the disclosed embodiments adapted for small and light, ground-based aircraft provides a number of benefits such as small sensor size and very low sensor power requirements, yielding the ability to mount the sensor in or on locations on an airframe with minimal space available, such as an under-wing inspection port or integrated with a wingtip position light. In addition, a laser distance sensor is not subject to the interference concerns and inaccuracy concerns of a radar or ultrasonic-based distance measurement sensor. Additionally, the cost of a laser distance sensor is substantially less than that of the other technologies.

Processor system 26 may comprise one or more processors and/or microcontrollers, memory, storage, appropriate communication busses to permit input and output of data to and from sensor 22 and display 24, as well as optional graphical user interface (GUI) elements in addition to display 24. In some embodiments employing a single, compact housing design as explained above, display 24 and processor system 26 may comprise a mobile telephone or other similar handheld mobile device. In such an embodiment the hardware aspects of processor system 26 are provided by the mobile device hardware and the functionality provided by a mobile application executable on the mobile device. When employing a mobile device based system, system 20 would also include a mount to facilitate secure mounting of the mobile device within the pilot's peripheral vision as elsewhere disclosed herein.

In a further alternative, sensor 22 is configured as shown in FIG. 1 to be a wireless sensing device mountable within a wing-mounted light housing, such that the wireless sensing device may be, for example, screwed into place on the mounting fixture otherwise used for a wingtip navigation light or strobe light with the associated light either integrated with the wireless sensing device, or reinstalled by screwing on over the wireless sensing device. With power supplied from the power connector in place for the navigation or strobe light, the wireless sensing device may wirelessly communicate with the processor system without the need for added wired connections or other modification to the aircraft. In another alternative embodiment, sensor 22, configured as such a wireless-sensing device, may be provided in a kit along with a mobile device mount and a link to download the processing system mobile application as described above. The link may be provided with product packaging or on the sensor or mount as a scannable, executable instruction, for example as a barcode such as a UPC barcode or QR code.

Processor system 26 may be configured by persons skilled in the computer arts, for example, for storing raw measurements from sensor 22, screening out measurements of poor quality, correcting raw measurements for their position on the aircraft to obtain height above ground, filtering corrected measurements over time to achieve a low-noise but responsive representation of the distance of the aircraft above the ground, using the corrected and filtered measurements with a set of distance constants appropriate to the aircraft type to determine the desired state of a height-above-ground display, driving the height-above-ground display with the resultant desired display state, and providing a system health status indication to the display. The additional GUI elements, such as a key pad and small auxiliary display, for example, can allow system 20 to be turned on or off, and display 24 to be brightened or dimmed. Processor system 26 also may be configured with calibration procedures, which may be initiated by a user through such additional GUI elements. In one example, post-installation calibration of system 20 is conducted to determine height of sensor 22 above ground with aircraft 10 sitting on the ground 12.

More specifically, processor system 26 is configured to process raw sensor distance measurements to yield useable data for advising a pilot of the distance yet to go for the lowest part of the aircraft to touch the runway surface during landing. In particular, when far above the landing surface, distance sensor 22 may not accurately measure or measure distance at all when the sensor range is exceeded. Also, there may be occasional false data points that must be screened out as outliers. Further, the data has noise that must be filtered in order to yield a useable height-above-ground signal to control a display. Conventional signal processing techniques such as low-pass filtering may be employed.

Additionally, the distance from the lowest point of the aircraft to the ground is in general different from the distance from the sensor to the ground, and this distance, which is installation-dependent, must be calibrated out and removed before using the raw distance data. A calibration mode may be provided for calibrating the system to the specific installation configuration with respect to sensor height above ground. In one embodiment, calibration is performed with the aircraft sitting on the ground after installation of sensor 22. In this condition, the system is activated to take a height-above-ground measurement with the wheels on the ground. A prompt may be provided through the user interface to allow the user to set the height as zero for the system.

After data processing and corrections as described above are made, information on height-above-landing surface must be relayed to the pilot in a manner consistent with good flight practices. Thus, for example, the actual height-above-ground information, e.g., numerical distances, are not appropriate to drive a display identically for all aircraft types. In order for the human pilot to react appropriately, display 24 must change state in a manner that allows sufficient time for the pilot to react in the flare maneuver, and that requires different relationships between height-above-ground and display-state transitions for different classes of aircraft. For example, a light aircraft that lands at 50 knots might need flare display transitions that occur at much smaller distance values than an aircraft that lands at 140 knots, which would require the flare to begin sooner in the last few seconds of descent to the runway. The distance constants configured into processor system 26, such as by software implementation or firmware, should be appropriate to the class of aircraft being instrumented, and typically will be determined by iterative flight test.

Figure 3:
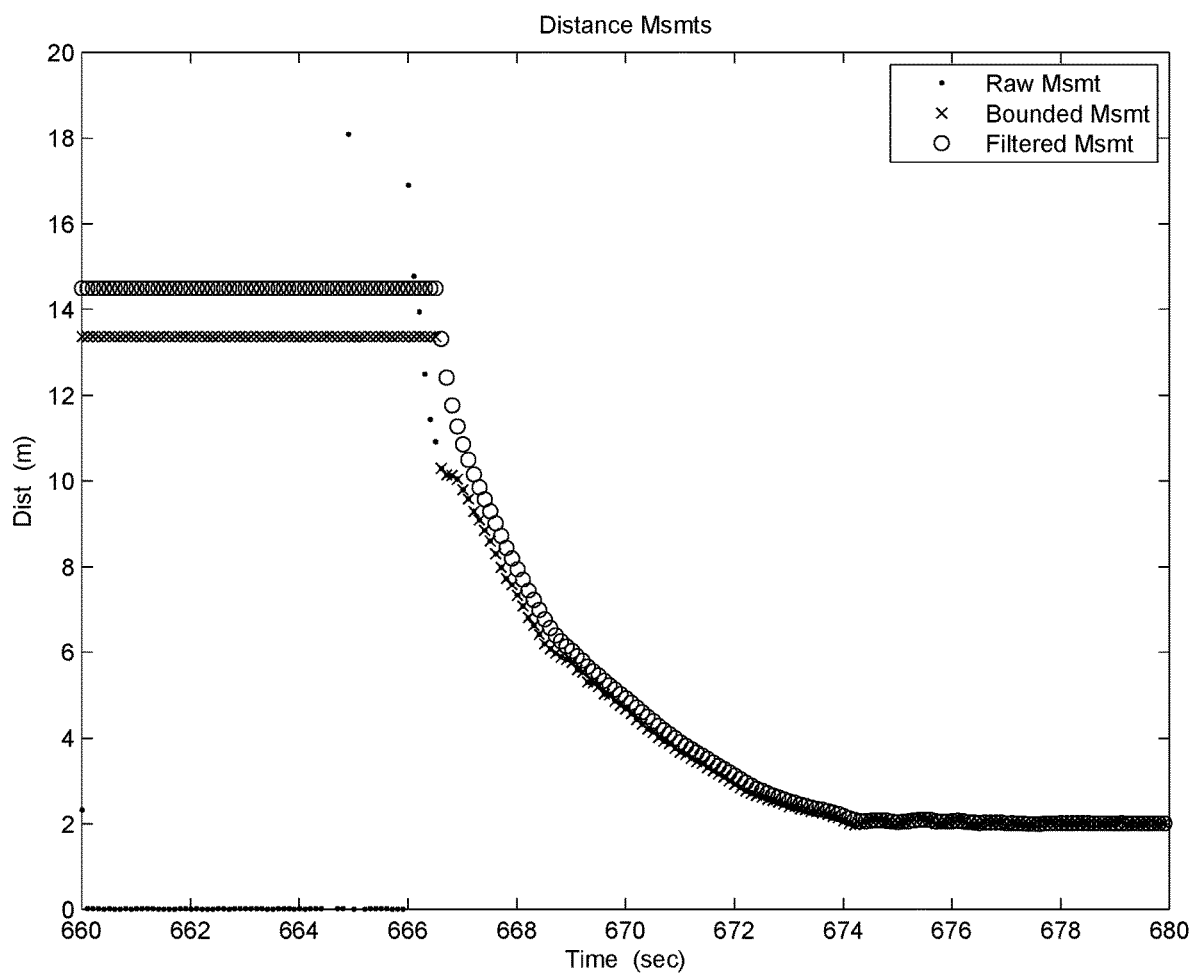
FIG. 3 is a plot showing flight measurements of distance-above-ground during a flare maneuver using an embodiment of the present disclosure.
Figure 4:
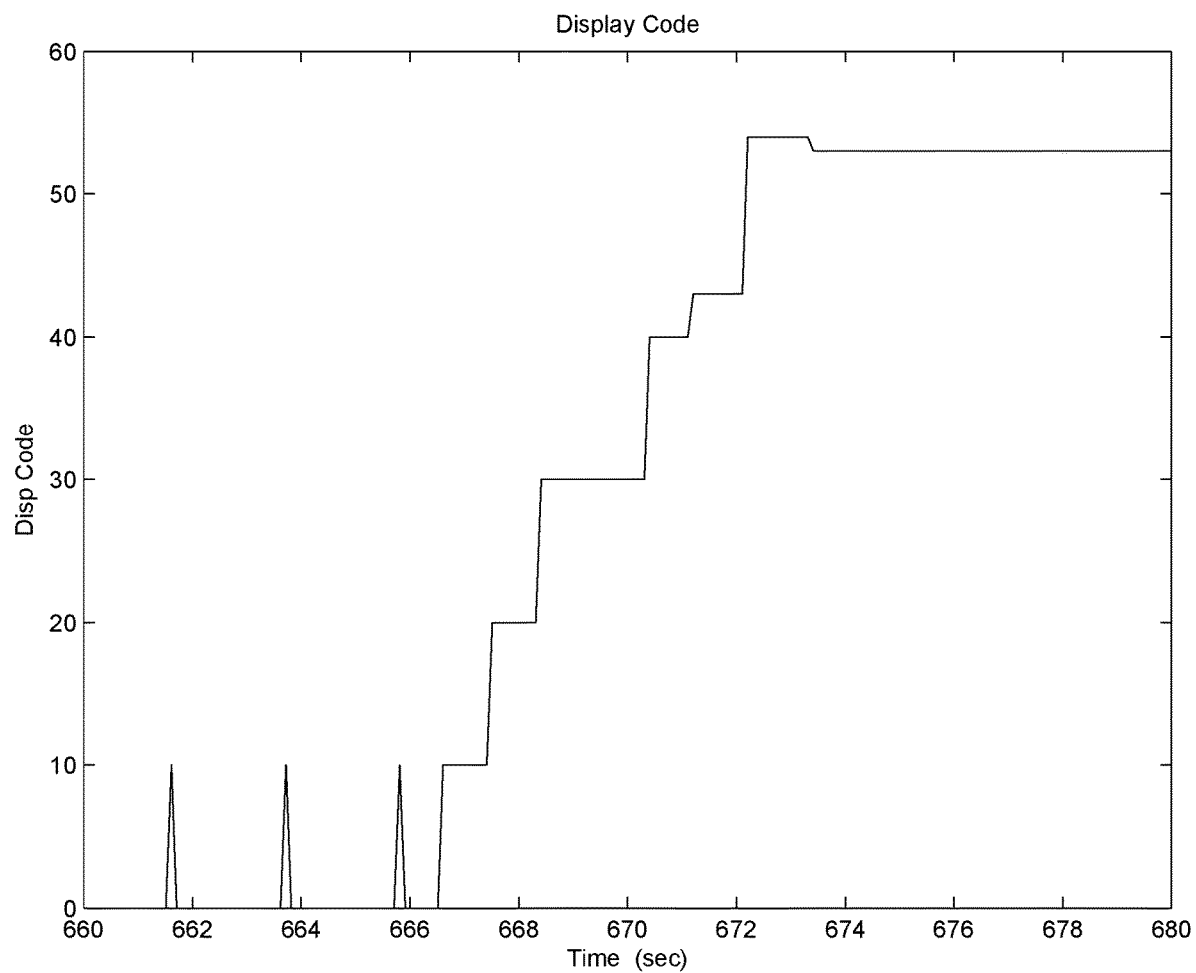
FIG. 4 shows a time plot of display codes generated by an embodiment of the disclosed system during a flare maneuver.

FIGS. 3 and 4 show, respectively, an example of distance-above-ground measurements from actual flight data, and the resulting display-state values produced by processor system 26 to drive a flare-assist display 24. FIG. 4 shows not only the display codes resulting from processing during a flare maneuver, beginning at approximately time 666.5, but also values at time 661.5, 663.5 and 665.5 as heartbeat displays, used to assure the pilot that the system is healthy and operational before the landing begins.

Figure 5:
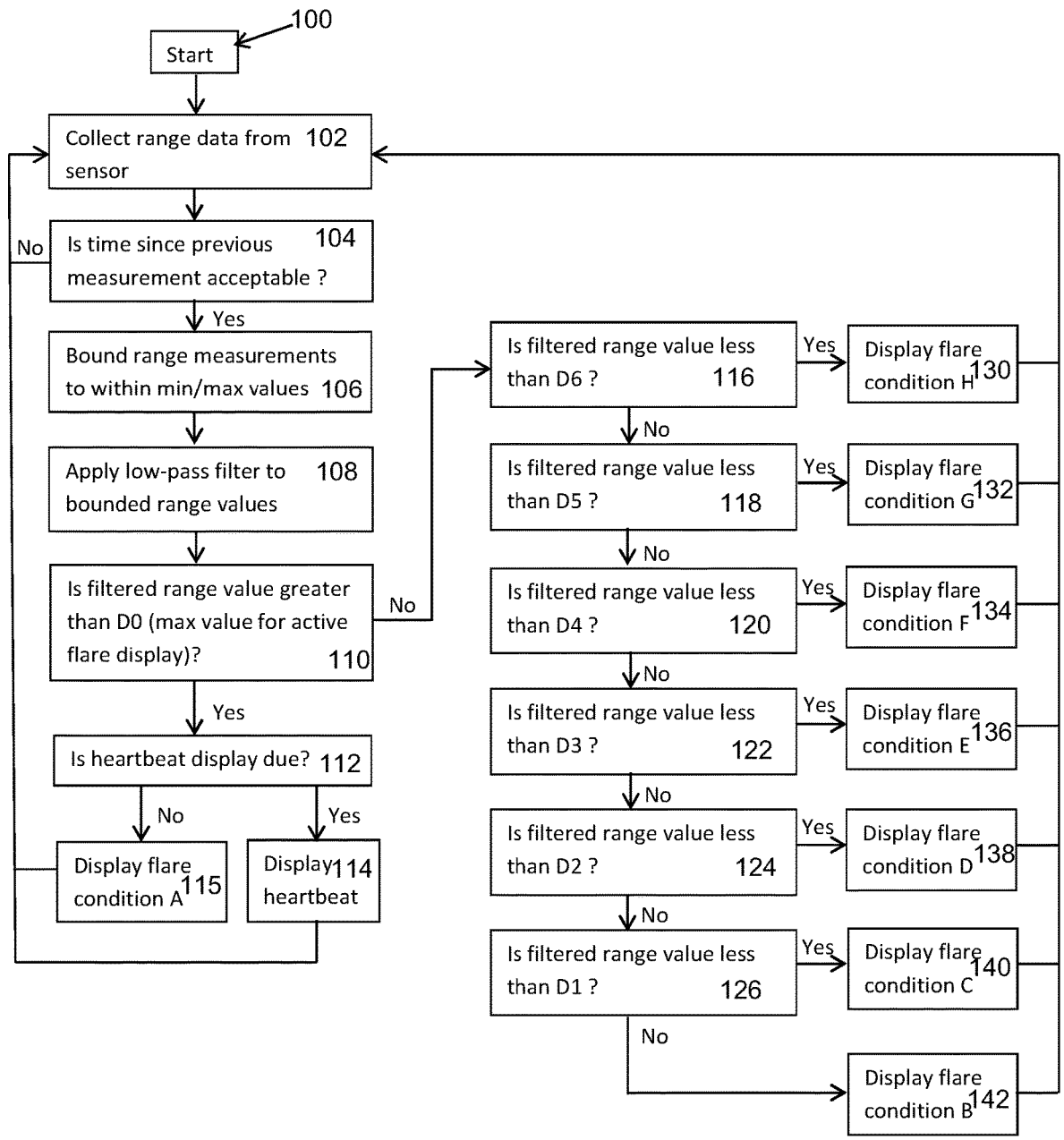
FIG. 5 is a flow chart showing process control in one embodiment of a disclosed system.

The flow diagram of FIG. 5 illustrates an embodiment of logic and processing executed by processor system 26 during a landing maneuver. As shown there, system 20 is initiated at start 100. Processor system 26 collects range data from sensor 22 at 102. Next, at 104, the time since previous sensor reading is determined and compared to a preset maximum value. In one example, maximum time may be set at 0.3 seconds, or between about 0.3 and about 0.5 seconds. Other times may be selected. Where maximum time parameter is exceeded, a new sensor reading is retrieved at 102. When time since previous reading is within preset maximum time, the returned distance measurement is bounded by minimum and maximum values at 106 in order to guarantee a good initial state for filtering. Low-pass filtering is applied to the bounded range values at 108. Thereafter the filtered range value is compared to a maximum range value (D0) at 110. Maximum range value corresponds to a distance above ground above which flare assist system 20 would typically not be effective. Where filtered distance value is determined to be above maximum range, at 112 the system determines whether a heartbeat display is due based on a preset time period. If due, the heart beat display is generated 114 and sent to display 24. If a heartbeat display is not due, display Condition A is generated 115 and sent to display 24. The purpose of the heartbeat display is to periodically assure the pilot that system 20 is operational.

When the filtered distance value is determined to be under the maximum range (D0), at 110, the value is compared to a series of threshold values in steps 116-126, wherein each threshold value corresponds to a different flare condition to be displayed by display 24 in steps 130-142, respectively. Threshold values and corresponding flare conditions are shown in Table 1 below.

TABLE 1

| Step (FIG. 5) | Threshold | Threshold Value (m) | Flare Condition (See FIG. 6) |
| --- | --- | --- | --- |
| 116 | <D6 | 0.4 | Condition H |
| 118 | <D5 | 1.0 | Condition G |
| 120 | <D4 | 1.75 | Condition F |
| 122 | <D3 | 2.5 | Condition E |
| 124 | <D2 | 5.0 | Condition D |
| 126 | <D1 | 7.5 | Condition C |
| 126 | >D1 | 7.5 | Condition B |
| 110/112 | >D0 | 12.5 | Condition A |

In order to provide more precise guidance as the aircraft approaches the landing surface, it may be preferable to sequence all or a set of lower threshold values in a series of ever decreasing steps. In other words, with ever decreasing steps, the height distance between each sequentially lower threshold value and the threshold value preceding is smaller as the sequence moves down to the smallest threshold value. In the sequence shown in Table 1, the steps between threshold values D1-D2 and D2-D3 are uniform and steps between D3-D4, D4-D5 and D5-D6 are decreasing steps.

Figure 5A:
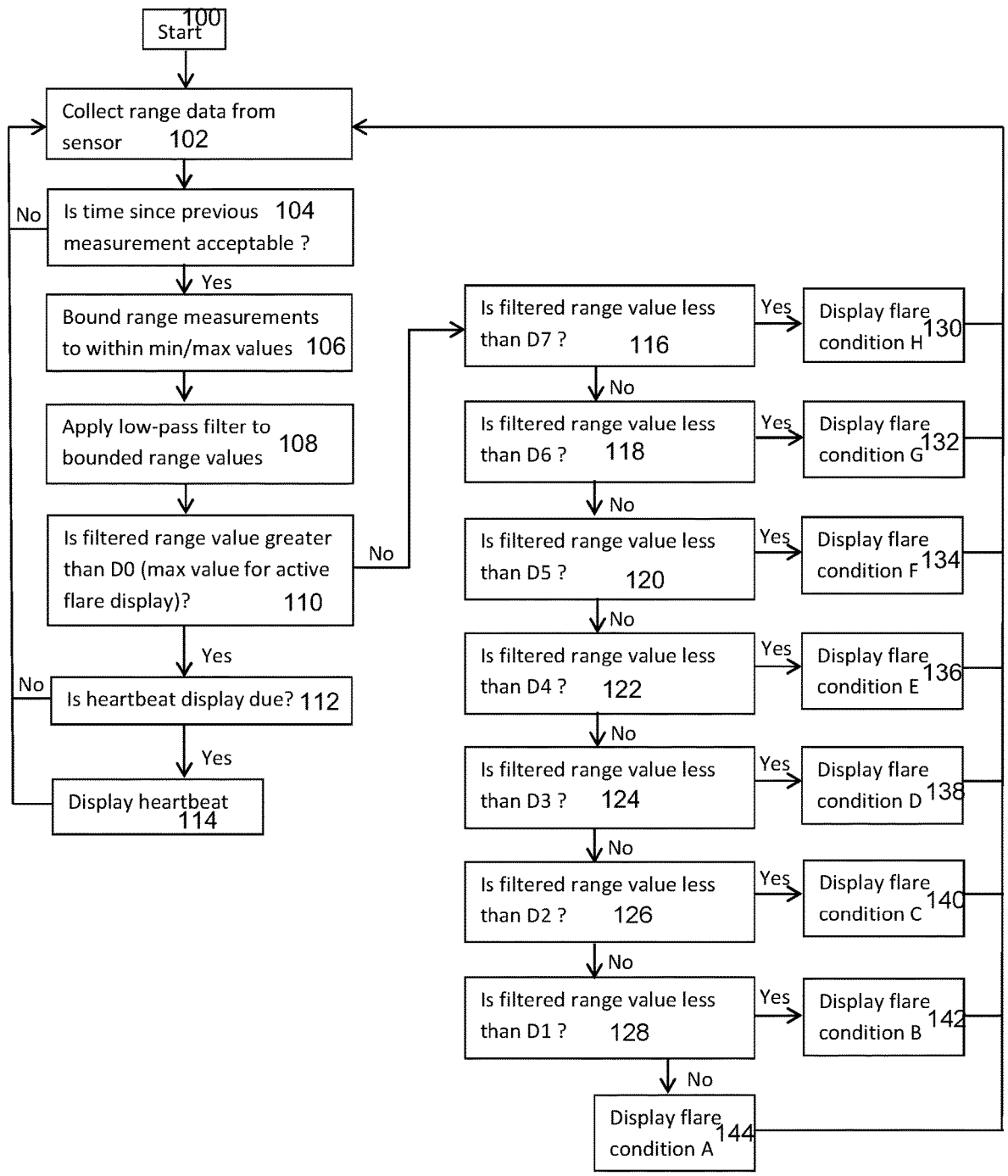
FIG. 5A is a flow chart showing process control in an alternative embodiment of a disclosed system.

An alternative logic and processing is illustrated in the flow diagram of FIG. 5A. In this alternative embodiment, an additional threshold step may be employed and then Flare Condition A is generated at step 144 based on a determination in step 128 that the filtered range value is less than the D1 value. In this alternative embodiment the D1 value may be the same or different than the D1 value in Table 1 above.

Threshold values shown in Table 1 are adapted for a light plane with a landing approach speed of approximately 70 knots. As will be appreciated by persons of ordinary skill in the art, the maximum value and threshold values should be scaled up proportionally for planes with higher landing approach speeds and scaled down proportionally for planes with lower landing approach speeds. Table 2 presents the verified threshold values as in Table 1 with calculated values for higher landing speed aircraft as further examples.

TABLE 2

| Distance value for flare display state | Values for 70-knot final approach speed (meters) (flight test verified) | Theoretical values for 100-knot final approach speed (meters) | Theoretical values for 130-knot final approach speed (meters) |
| --- | --- | --- | --- |
| D0 | 12.5 | 17.9 | 23.2 |
| D1 | 7.5 | 10.7 | 13.9 |
| D2 | 5.0 | 7.1 | 9.3 |
| D3 | 2.5 | 3.6 | 4.6 |
| D4 | 1.75 | 2.5 | 3.3 |
| D5 | 1.0 | 1.4 | 1.9 |
| D6 | 0.4 | 0.6 | 0.74 |

Notes:
For input data bounding prior to filtering:
"Max value" is set to D0 + 1.0 meter
"Min value" is set to the Sensor Height Above Ground determined during calibration with aircraft on ground, minus 0.2 meter It is to be noted that while the embodiments exemplified herein utilize seven (7) threshold values, any number more or less may be utilized based on aircraft characteristics and the teachings presented herein. Generally, it is believe that a number of threshold values less than about four (4) would be insufficient, but five, six, seven, eight or nine, may be used. Using seven threshold values may have an advantage of allowing the pilot sufficient precision with regard to distance to the landing surface remaining, while preserving a sufficiently significant information content for each display transition.

The configuration of flare-assist display 24 must take into account human-factors imperatives inherent in the pilot's control of the flare to land, often the most demanding portion of any flight in a typical aircraft. In general, the pilot must focus his/her central vision down the runway in order to safely land. There is no possibility of focusing on an auxiliary display, and looking down to the instrument panel during the landing flare is most undesirable. Therefore, a visual display for flare assistance must provide visual information in the peripheral visual field of the pilot, rather than in the central vision. The exception to this general rule would be in the case of a head-up display in which symbology in the pilot's central vision does not interfere with looking far down the runway simultaneously. Thus, in some embodiments, display 24 may comprise a head-up display projector.

Flare-assist displays 24, in accordance with embodiments disclosed herein, will be configured for placement within the peripheral vision of the pilot when his/her central vision is focused on the runway environment during landing. Other attributes of flare-assist display 24 include: bright enough to be seen in bright daylight and dimmable for use at night, color changes to enhance the perception of changing display state and, optionally, brightness or size changes to enhance the perception of changes in display state.

Figure 6:
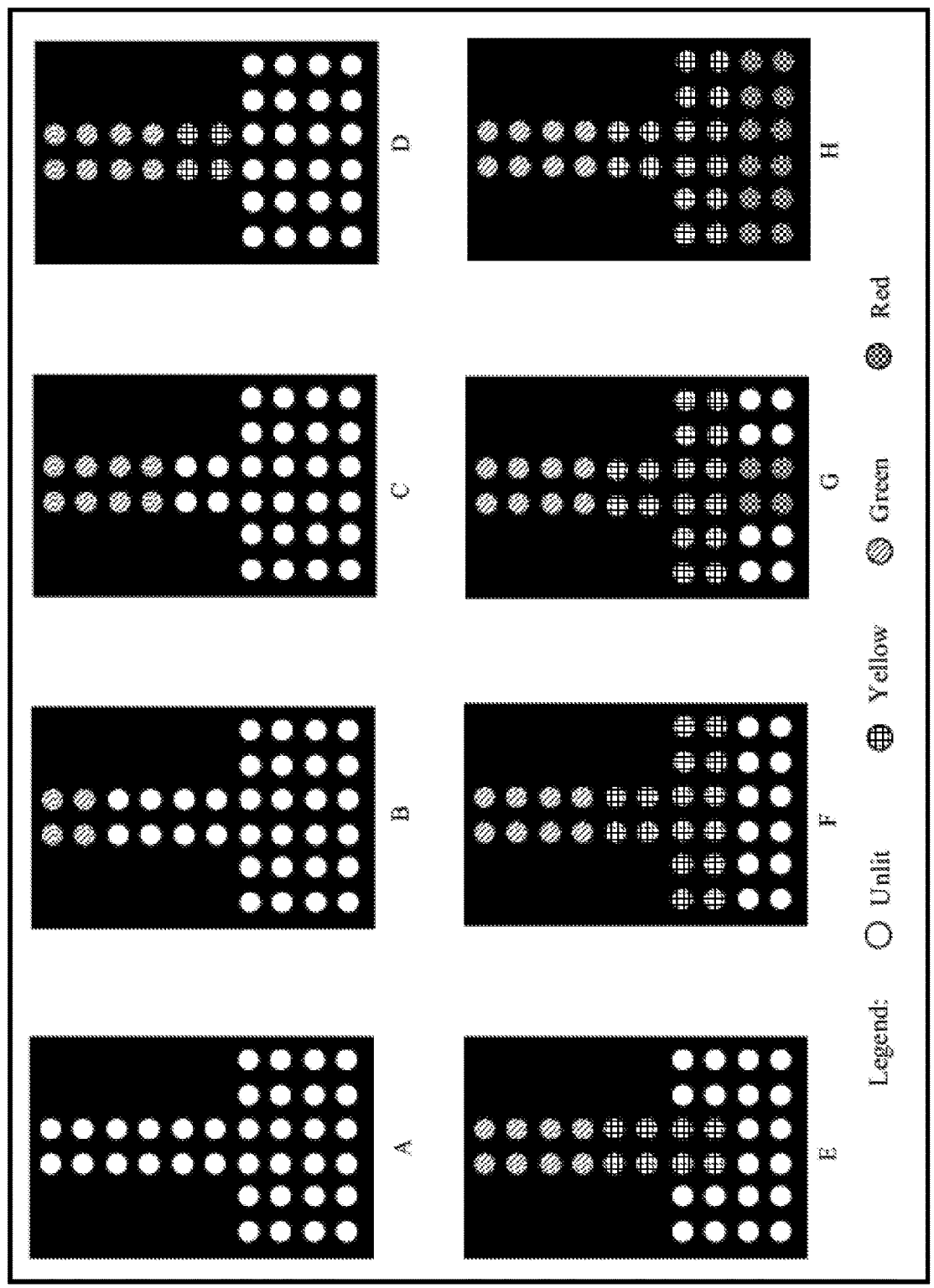
FIG. 6 shows a sequence of display system outputs A through H, displaying different flare condition indications as may be generated by the system during the course of an exemplary landing and flare maneuver.

FIG. 6 shows an example of flare-assist display 24 and the different visual indications presented by display 24 corresponding to the flare conditions identified above in Table 1. In one example, flare-assist display 24 indicates flare conditions in a manner appropriate for peripheral-vision as follows: Condition A, display unlit, indicates distance well above the runway. Conditions B through E indicate that the flare is to be commenced and indicate that the aircraft is getting progressively closer to touchdown. Conditions F and G correspond to the last few seconds during which the final flare pitch attitude should be progressively achieved. In Condition H the aircraft should be fully flared and ready for touchdown. The combination of colors and increasing display area make this display appropriate as a peripheral-vision indicator, allowing the pilot to focus central vision down the runway during the landing. Other alternative embodiments of a display that provide similar increasing display size and/or intensity, optionally combined with changing color and easily perceivable in the pilot's peripheral vision may be used. For example, a display such as shown in FIG. 6 may be realized with an array of discrete color LEDs arranged in the pattern shown, in which case the current flare condition signal from processor system 26 may comprise simple instructions as to which LEDs are to be illuminated. Alternatively, display 24 may be realized with a number of different display types, such an LED, OLED or LCD screen, in which case the current flare condition signal may comprise an image signal converted into the displayed image by the appropriate display driver for the display type.

The foregoing has been a detailed description of illustrative embodiments of the invention. It is noted that in the present specification and claims appended hereto, conjunctive language such as is used in the phrases "at least one of X, Y and Z" and "one or more of X, Y, and Z," unless specifically stated or indicated otherwise, shall be taken to mean that each item in the conjunctive list can be present in any number exclusive of every other item in the list or in any number in combination with any or all other item(s) in the conjunctive list, each of which may also be present in any number. Applying this general rule, the conjunctive phrases in the foregoing examples in which the conjunctive list consists of X, Y, and Z shall each encompass: one or more of X; one or more of Y; one or more of Z; one or more of X and one or more of Y; one or more of Y and one or more of Z; one or more of X and one or more of Z; and one or more of X, one or more of Y and one or more of Z.

Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve aspects of the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. An aircraft landing flare assist system, comprising:
a distance sensor configured to be mounted in an aircraft to measure a distance above a landing surface and generate a measurement signal indicative of the measured distance;
a processor system configured to receive the measurement signal from the distance sensor, and further configured to (i) compare the measured distance to a series of threshold values, each threshold value corresponding to a different flare condition, and (ii) generate a current flare condition signal corresponding to a threshold value matched to the measured distance in said compare; and
a visual display configured to receive the current flare condition signal and present a visual display representing the current flare condition.

2. The system of claim 1, wherein the visual display is configured and dimensioned to be mounted on an aircraft glare shield without obstructing the pilot's central vision of the landing surface during landing, and each different flare condition is represented by a unique visual indicator displayed on said visual display.

3. The system of claim 2, wherein the visual display comprises a linear array of colored light emitters configured to be mounted to be observable in a pilot's peripheral vision.

4. The system of claim 2, wherein said visual display and processing system comprise a mobile device executing a stored instruction set.

5. The system of claim 1, wherein the visual display comprises an array of color changes as the height above the landing surface changes.

6. The system of claim 1, wherein the threshold values comprise a sequence of at least four values comprising a maximum value and lesser values arranged in decreasing height steps.

7. The system of claim 6, wherein the threshold values comprise a sequence of at least seven values comprising a maximum value, three initial lesser values separated by uniform steps and three subsequent lesser values separated by decreasing steps.

8. The system of claim 6, wherein the current flare condition signal corresponding to each successive lesser threshold value is configured to produce a brighter visual display.

9. The system of claim 1, wherein the distance sensor comprises a LIDAR distance measurement device.

10. The system of claim 1, wherein the visual display comprises a head-up display projector.

11. The system of claim 1, wherein the flare condition signal for each different flare condition causes the visual display to display a unique color sequence for each different flare condition.

12. An aircraft landing flare assist system, comprising:
a distance sensor configured to be mounted to an aircraft to measure a distance above a landing surface and generate a measurement signal indicative of the measured distance;
a processor system configured to receive the measurement signal from the distance sensor, and further configured to (i) compare the measured distance to a series of threshold values, each threshold value corresponding to a different flare condition, and (ii) generate a current flare condition signal corresponding to a threshold value matched to the measured distance in said compare; and
a visual display configured and dimensioned to be mounted on an aircraft glare shield without obstructing the pilot's central vision of the landing surface during landing and further configured to receive the current flare condition signal and present a visual display representing the current flare condition as a unique color sequence for each different flare condition.

13. The system of claim 12, wherein the threshold values comprise a sequence of at least seven values comprising a maximum value, three initial lesser values separated by uniform steps and three subsequent lesser values separated by decreasing steps.

14. The system of claim 13, wherein the current flare condition signal corresponding to each successive lesser threshold value is configured to produce a brighter visual display.

15. A method for assisting an aircraft pilot during a flare-to-land maneuver as the aircraft approaches a landing surface, the method comprising:
repeatedly detecting the height of the aircraft above the landing surface during the approach;
comparing the detected heights to a series of decreasing threshold values, each said threshold value corresponding to a different flare condition; and
displaying the changing flare conditions to the pilot within the pilot's peripheral vision and outside of the pilot's central vision in a series of displays of changing colors and increasing brightness as the aircraft approaches the landing surface.

16. The method of claim 15, wherein the threshold values comprise a sequence of at least four values comprising a maximum value and lesser values arranged in decreasing height steps.

17. The system of claim 16, wherein the threshold values comprise a sequence of at least seven values comprising a maximum value, three initial lesser values separated by uniform steps and three subsequent lesser values separated by decreasing steps.

18. A kit for installing an aircraft landing flare assist system in an aircraft, comprising:
a wireless distance sensor configured to be mounted to an external lighting mount on the aircraft and measure a distance above a landing surface with a light also installed in the same location, said wireless distance sensor further configured to generate a wireless measurement signal indicative of the measured distance; and
a non-transitory computer readable medium containing an instruction set downloadable to a mobile device to configure the mobile device to receive the wireless measurement signal from the wireless distance sensor, and to (i) compare the measured distance to a series of threshold values, each threshold value corresponding to a different flare condition, to determine a current flare condition and (ii) generate a visual representation of the current flare condition on the mobile device display.

19. The kit of claim 18, further comprising a mobile device mount configured to securely mount a mobile device within the aircraft within the pilot's peripheral vision.

20. The kit of claim 18, further comprising a non-transitory computer readable medium containing instructions executable by the mobile device to initiate download of said instruction set to the mobile device.

21. A kit for installing an aircraft landing flare assist system in an aircraft, comprising:
a wireless distance sensor configured to be mounted to externally on the aircraft and measure a distance above a landing surface, said wireless distance sensor further configured to generate a wireless measurement signal indicative of the measured distance; and a non-transitory computer readable medium containing instructions executable by a mobile device to initiate download of an instruction set stored on a remote non-transitory computer readable medium, said instruction set comprising instructions to configure the mobile device to receive the wireless measurement signal from the wireless distance sensor, and to (i) compare the measured distance to a series of threshold values to determine a current flare condition and (ii) generate a visual representation of the current flare condition on the mobile device display;

wherein each threshold value corresponds to a different flare condition and the series of threshold values comprise a sequence of at least four values comprising a maximum value and lesser values arranged in decreasing height steps.

22. The computer-implemented method of claim 21, wherein the display signal is further configured to cause the display to present a series of changing colors and increasing brightness as the aircraft approaches the landing surface.

23. A computer-implemented method for assisting an aircraft pilot during a flare-to-land maneuver as the aircraft approaches a landing surface, the method comprising:

receiving at a processor a signal indicating a height of the aircraft above the landing surface during the approach;

repeatedly comparing said signal with the processor to a sequence of at least four threshold height values stored in a memory, the threshold height values comprising a maximum value and lesser values arranged in decreasing height steps, each said threshold height value corresponding to a different flare condition; and generating with the processor a display signal configured to cause a display to display changing flare conditions in response to changes in aircraft height as indicated by said signal received by the processor.

\* \* \* \* \*